US010208948B2

(12) United States Patent
Ni et al.

(10) Patent No.: US 10,208,948 B2
(45) Date of Patent: Feb. 19, 2019

(54) SOLID FUEL GRADE GASIFICATION-COMBUSTION DUAL BED POLY-GENERATION SYSTEM AND METHOD THEREOF

(71) Applicant: SHANGHAI BOILER WORKS CO., LTD., Shanghai (CN)

(72) Inventors: Jianjun Ni, Shanghai (CN); Zhen Yang, Shanghai (CN); Nan Chen, Shanghai (CN); Jie Xiong, Shanghai (CN)

(73) Assignee: SHANGHAI BOILER WORKS CO., LTD., Shanghai (CN)

( * ) Notice: Subject to any disclaimer, the term of this patent is extended or adjusted under 35 U.S.C. 154(b) by 104 days.

(21) Appl. No.: 14/900,985

(22) PCT Filed: Feb. 4, 2015

(86) PCT No.: PCT/CN2015/072219
§ 371 (c)(1),
(2) Date: Dec. 22, 2015

(87) PCT Pub. No.: WO2015/143955
PCT Pub. Date: Oct. 1, 2015

(65) Prior Publication Data
US 2017/0321889 A1 Nov. 9, 2017

(30) Foreign Application Priority Data

Mar. 28, 2014 (CN) .......................... 2014 1 0120861

(51) Int. Cl.
*F23C 10/10* (2006.01)
*C10J 3/54* (2006.01)
(Continued)

(52) U.S. Cl.
CPC ................. *F23C 10/10* (2013.01); *C10J 3/54* (2013.01); *C10J 3/84* (2013.01); *F23C 10/005* (2013.01); *Y02E 20/18* (2013.01); *Y02E 50/32* (2013.01)

(58) Field of Classification Search
CPC combination set(s) only.
See application file for complete search history.

(56) References Cited

U.S. PATENT DOCUMENTS 1,458,983 A * 6/1923 Kirby ....................... C10G 1/02
196/138
2,579,398 A * 12/1951 Roetheli ................. C10B 49/22
201/20

(Continued)

*Primary Examiner* — Kaity V Chandler
(74) *Attorney, Agent, or Firm* — Houtteman Law LLC (57) ABSTRACT

The present invention demonstrates a solid fuel grade gasification-combustion dual bed poly-generation system, comprising a combustion system, a gasification system, a synthesized gas cooling and purifying system and a synthesized gas methanation system. The combustion system is connected with the gasification system through a circulating material return system. The gasification system mainly adapts the circulating fluidized-bed combustion mode. The gasification system adapts the fluidized-bed incomplete gasification method and the generated semi-coke is returned to the combustion system for re-utilization. The synthesized gas purifying and cooling unit adapts water cycling and combustible recycling. The by-products, $CO_2$ and steam, in the methanation unit can be recovered, so the maximum utilization rate of energy in this system is realized.

7 Claims, 3 Drawing Sheets (51) Int. Cl.
*C10J 3/84* (2006.01)
*F23C 10/00* (2006.01)

(56) References Cited

U.S. PATENT DOCUMENTS

| | | | | | |
|---|---|---|---|---|---|
| 2,680,065 | A * | 6/1954 | Atwell | ............... | C10J 3/10 48/202 |
| 2,945,075 | A * | 7/1960 | Scofield | ............... | C07C 7/11 208/48 Q |
| 2,987,386 | A * | 6/1961 | Chapman | ............... | C01B 3/36 209/171 |
| 2,992,906 | A * | 7/1961 | Guptill, Jr. | ............... | B01D 12/00 252/373 |
| 3,017,259 | A * | 1/1962 | Eastman | ............... | C01B 3/061 423/415.1 |
| 3,030,297 | A * | 4/1962 | Schroeder | ............... | C10G 1/06 208/107 |
| 3,232,727 | A * | 2/1966 | Guptill, Jr. | ............... | C01B 3/36 252/373 |
| 3,565,784 | A * | 2/1971 | Tassoney | ............... | C01B 3/22 201/20 |
| 3,615,297 | A * | 10/1971 | Dille | ............... | C10K 1/10 210/803 |
| 3,717,700 | A * | 2/1973 | Robison | ............... | C01B 17/60 110/345 |
| 3,960,702 | A * | 6/1976 | Allred | ............... | C10G 1/02 208/428 |
| 3,970,524 | A * | 7/1976 | Funk | ............... | B01D 53/005 201/2.5 |
| 3,971,639 | A * | 7/1976 | Matthews | ............... | C10J 3/463 252/373 |
| 3,985,519 | A * | 10/1976 | Kalina | ............... | C10J 3/54 252/373 |
| 4,032,305 | A * | 6/1977 | Squires | ............... | B01J 8/28 201/31 |
| 4,057,402 | A * | 11/1977 | Patel | ............... | C10J 3/482 110/342 |
| 4,337,066 | A * | 6/1982 | Kunii | ............... | B01J 8/26 422/141 |
| 4,936,047 | A * | 6/1990 | Feldmann | ............... | C10J 3/54 110/342 |
| 5,068,010 | A * | 11/1991 | Mundstock | ............... | C10B 1/04 201/34 |
| 5,284,550 | A * | 2/1994 | Tanca | ............... | C10J 3/54 162/30.1 |
| 5,937,652 | A * | 8/1999 | Abdelmalek | ............... | C10J 3/54 60/648 |
| 6,381,962 | B1 * | 5/2002 | Ohshita | ............... | F22B 31/045 60/645 |
| 6,548,197 | B1 * | 4/2003 | Chandran | ............... | C10J 3/482 429/423 |
| 8,088,832 | B2 * | 1/2012 | Melnichuk | ............... | C07C 29/149 518/700 |
| 8,349,504 | B1 * | 1/2013 | Radovich | ............... | C01B 3/32 429/416 |
| 9,752,086 | B2 * | 9/2017 | Bohlig | ............... | C10L 5/46 |
| 2004/0188340 | A1 * | 9/2004 | Appel | ............... | B01D 3/009 210/321.68 |
| 2004/0244289 | A1 * | 12/2004 | Morozumi | ............... | C01B 3/323 48/77 |
| 2006/0004237 | A1 * | 1/2006 | Appel | ............... | A61L 11/00 585/241 |
| 2009/0265987 | A1 * | 10/2009 | Xu | ............... | C10J 3/482 48/89 |
| 2010/0101146 | A1 * | 4/2010 | Fujimori | ............... | C10J 3/482 48/210 |
| 2010/0281878 | A1 * | 11/2010 | Wormser | ............... | C10J 3/482 60/781 |
| 2011/0020145 | A1 * | 1/2011 | Katagiri | ............... | F23G 5/0276 417/54 |
| 2012/0234217 | A1 * | 9/2012 | Isaksson | ............... | C10J 3/56 110/346 |
| 2012/0266793 | A1 * | 10/2012 | Bohlig | ............... | F23G 5/027 110/342 |
| 2013/0017460 | A1 * | 1/2013 | Keefer | ............... | B01D 53/047 429/419 |
| 2013/0154278 | A1 * | 6/2013 | Abughazaleh | ............... | F23C 99/00 290/1 R |
| 2013/0280792 | A1 * | 10/2013 | Chernov | ............... | B09B 3/005 435/257.1 |
| 2014/0001098 | A1 * | 1/2014 | Bao | ............... | C10B 53/06 208/187 |
| 2014/0209448 | A1 * | 7/2014 | Nakazawa | ............... | B01D 19/0005 202/166 |
| 2015/0040479 | A1 * | 2/2015 | Yang | ............... | C10L 3/08 48/127.7 |
| 2015/0041720 | A1 * | 2/2015 | Zhang | ............... | C10K 1/02 252/373 |
| 2015/0118723 | A1 * | 4/2015 | Duzoglou | ............... | C12M 43/00 435/134 |
| 2015/0353849 | A1 * | 12/2015 | Mouri | ............... | C10J 3/485 422/109 |
| 2016/0186079 | A1 * | 6/2016 | Xu | ............... | C10K 3/023 252/373 |
| 2016/0368783 | A1 * | 12/2016 | Ertel | ............... | C02F 1/048 |

\* cited by examiner

SOLID FUEL GRADE GASIFICATION-COMBUSTION DUAL BED POLY-GENERATION SYSTEM AND METHOD THEREOF

TECHNICAL FIELD

The present invention relates to a solid fuel grade gasification-combustion dual bed poly-generation system and a method thereof, belonging to the technical field of poly-generation.

DESCRIPTION OF THE RELATED ART

Replacing a part of the oil and gas resources by coal resources is a way that must be taken for the sustainable development of the economic construction of our country. Features of the domestic energy structure determine that seeking the replaceable resources of the oil and gas is a long-term strategy for the economic development and energy strategy safety of our country. Clean coal utilization is a premise of the development of the modern coal chemical technology which uses coal as the raw material and aims at diversified application.

Coal-based poly-generation technologies can be classified into two types according to the existing technology applications. One is led by the gasification technology whose main products are synthesized gases, and the by-products that include low-pressure steam. Such system is a poly-generation system that can realize use of the synthesized gas for power generation by gas and steam turbines, the conversion of the synthesized gas into chemical raw materials to synthesize chemicals, and realize regional heat supply, etc. In terms of technological classification, from a technical point of view, the coal-based poly-generation technologies can also be classified into three typed core technologies, such as the entrained flow bed, the fixed bed and the fluidized bed gasification technologies.

For example, the first domestic 60 MW IGCC power generation station and 240,000 t methanol/year domestication project constructed by China YanKuang Group in Shandong are based on the gasification entrained flow bed coal gasification technology developed by the East China University of Science and Technology, etc. Another technology is coal-based poly-generation technology based on combustion power generation, combining thermal decomposition furnaces to realize the poly-generation system to produce products that mainly include electricity, synthesized gas and coal tar, for example, Chinese patents CN200910153522 and CN 201210064139. A representative technology is coal-based power generation-thermal decomposition poly-generation technology developed by Zhejiang University, etc. According to this technology, a 300 MW coal combustion circulating fluidized-bed compound thermal decomposition poly-generation device has been manufactured and put into trial operation. The poly-generation technologies applied to systems based on the circulating fluidized-bed boilers and integrated chemical reactions are of low investment and high technological reliability. However, the technical advantages of the two different majors, namely thermoelectricity and chemicals, must be fully used and optimally collocated and integrated to realize the efficient, stable and economical operation of the poly-generation system. At present, the circulating fluidized-bed-thermal decomposition poly-generation technologies in use have problems; the difficulty in separation of the tar after thermal decomposition causes blockage and corrosion to pipes and valve systems. The problem that the thermal decomposition system excessively depends on the heat supplied by the boiler system results in limited in loads and seriously affects the reliability and stability of the system.

CONTENTS OF THE PRESENT INVENTION

The objective of the present invention is to provide a poly-generation system which can easily implement large-scaled amplification and run stably and a poly-generation process integrated power generation, district heating and coal chemical production.

To solve the above technical problems, one technical solution of the present invention provides a solid fuel grade gasification-combustion dual bed poly-generation system, characterized by comprising a circulating fluidized-bed combustion boiler, a circulating fluidized-bed gasification boiler, a synthesized gas purification unit and a methanation unit;

The bottom of the circulating fluidized-bed combustion boiler is provided with a combustion boiler slag outlet and a combustion boiler fluidizing air inlet. The fluidizing air enters the combustion boiler fluidizing air inlet and then flows to the circulating fluidized-bed combustion boiler via a combustion boiler air distribution unit. One part of the fuel enters the circulating fluidized-bed combustion boiler via a combustion boiler fuel feeding opening; flue gas generated during combustion enters at least a primary combustion boiler cyclone separation unit. The gas after separation is directly exhausted, while separated ash particles are returned back into the circulating fluidized-bed combustion boiler via a boiler material return unit. The heat generated during combustion is used to produce steam which is used for external supply and for the circulating fluidized-bed gasification boiler itself.

The bottom of the circulating fluidized-bed gasification boiler is provided with a semi-coke outlet and a gasification boiler fluidizing air inlet. A gasifying agent for gasification is sent into the gasification boiler fluidizing air inlets and then flows into the circulating fluidized-bed gasification boiler via a gasification boiler air distribution unit. Steam in the gasifying agent comes from a combustion boiler Steam and/or methanation unit. Carbon dioxide is generated by the methanation unit. The other part of the fuel is fed into the circulating fluidized-bed gasification boiler via a gasification boiler fuel feeding opening. The semi-coke generated by gasification is discharged via a semi-coke outlet and then sent into the combustion boiler fuel feeding opening. The synthesized gas enters at least a primary gasification cyclone separation unit via a synthesized gas outlet on the top of the circulating fluidized-bed gasification boiler. After separation the synthesized gas is sent into a synthesized gas purification unit, while the separated ash particles are sent back into the circulating fluidized-bed gasification boiler and/or the combustion boiler fuel feeding opening via a gasification boiler material return unit;

The synthesized gas purification unit primarily washes and removes the dust from the synthesized gas, uses water as a cooling media to cool the synthesized gas in a heat exchange mode, the cooled gas is fed to the methanation unit, where the oil-water separation occurs on at least one part of the sewage generated during cooling, and the impurities emitted from-the separation is fed to the combustion boiler fuel feeding opening or the gasification boiler fuel feeding opening of the gasification furnace or is used as for a further process;

The methanation unit converts the fed synthesized gas into synthesized natural gas through low-temperature methanol washing process and methanation process. The carbon dioxide generated in the low-temperature methanol washing process is fed into the gasification boiler fluidizing air inlets and steam as a side product by the methanation process is fed into to the gasification boiler fluidizing air inlet, or used as a supplemental steam required by the methanation unit or other purpose.

Preferably, the said gasification boiler cyclone separation unit is a two-class cyclone separation structure consisting of a primary cyclone separator and a secondary cyclone separator. The ash particles produced by the primary cyclone separator are sent back into the circulating fluidized-bed gasification boiler through the gasification boiler material return unit, and those produced by the secondary cyclone separator are sent back into the combustion boiler fuel feeding opening.

Preferably, the said circulating fluidized-bed gasification boiler is also provided with side gasifying agent inlets. The side gasifying agent inlets are located above the gasification boiler fluidizing air inlet. Oxygen and steam are sent into side gasifying agent inlets.

Preferably, the steam generated during the chilling process in the said synthesized gasification purification unit is led to the gasification boiler fluidizing air inlet.

Preferably, the said synthesized gas purification unit comprises a cooling scrubber a heat recovery boiler, a cooling unit, a first oil-water separator, a second oil-water separator and a sewage settlement tank. The synthesized gas coming from the gasification boiler cyclone separator unit is sent into the cooling scrubber or the heat recovery boiler;

While the synthesized gas is sent into the cooling scrubber, the cooling scrubber, the heat recovery boiler and the cooling unit are connected each other in turn; the cooling scrubber primarily washes, removes the dust and chills the synthesized gas and the cooled synthesized gas enters into the heat recovery boiler. The heat recovery boiler is supplied with de-salted water simultaneously and the de-salted water exchanges heat with the synthesized water in the heat recovery and then as a-cool-washing water is led to the cooling scrubber. The synthesized gas enters the cooling unit after the heat exchange. The cooling unit is also supplied with a supernatant as a cooling media from the sewage settlement tank simultaneously. The synthesized gas flows out of the cooling unit and then is sent into the methanation unit. The sewage produced by the heat recovery boiler and the cooling unit in the heat exchange process is sent to the first oil-water separator and the second oil-water separator through respective pipes. The first oil-water separator and the second oil-water separator as well as the sewage settlement tank are connected in turn A part of the sewage is separated by the first oil-water separator and used as the cool-washing water is led to the cooling scrubber. The impurities emitted by the first oil-water separator and the second oil-water separator are sent to the combustion boiler fuel feeding opening or sent to the gasification boiler fuel feeding opening or as by-products are used for further processed. A part of the sewage is treated by the first oil-water separator and the second oil-water separator and then is collected in the sewage settlement tank. The supernatant produced by the sewage settlement tank is sent to the cooling unit. The deposits accumulated are sent to the outside for further treatment including some residues is treated in the sewage;

While the synthesized gas is sent into the heat recovery, the heat recovery boiler, the cooling scrubber and the cooling unit are connected each other in turn;

The heat recovery boiler is supplied with de-salted water and supplied with the synthesized gas from the gasification boiler cyclone separation unit simultaneously. The de-salted water exchanges heat with the synthesized water in the heat recovery boiler to produce steam. The steam as a gasifying agent is sent into the gasification boiler fluidizing air inlets. After heat exchange, the gasifying agent is sent into the cooling scrubber. The cooling scrubber primarily washes, removes the dust and chills the fed synthesized gas and then the cooled synthesized gas is fed into the cooling unit. The cooling unit is also supplied with a supernatant as a cooling media from the sewage settlement tank simultaneously and the synthesized gas flows out of the cooling unit and then is sent into the-methanation unit. The sewage produced by the cooling scrubber and the cooling unit in the heat exchange process is sent to the first oil-water separator and the second oil-water separator through respective pipes. The first oil-water separator and the second oil-water separator as well as the sewage settlement tank are connected in turn; a part of the sewage is processed by the first oil-water separator. The product as the cool-washing water is led to the cooling scrubber. The impurities emitted by the first oil-water separator and the second oil-water separator are sent to the combustion boiler fuel feeding opening or sent to the gasification boiler fuel feeding opening or as by-products for further process.

A part of the sewage passes through the first oil-water separator and the second oil-water separator and then is collected in the sewage settlement tank. The supernatant produced by the sewage settlement tank is sent to the cooling unit, The deposits accumulated are sent to the outside for further treatment including some residues is treated in the sewage.

Preferably, when the synthesized gas is sent into the cooling scrubber, the said heat recovery boiler is connected to the first oil-water separator through the heat exchanger.

Preferably, if the synthesized gas is sent into the cooling scrubber, the exit temperature of the synthesized gas after flowing through the of said cooling scrubber is 150° C.-250° C.; the exit temperature of the synthesized gas after passing through the heat recovery boiler is 120° C.-180° C.; the exit temperature after passing through the cooling unit is 25° C.-45° C.

Preferably, the methanation unit comprises a shift reaction unit, a low-temperature methanol washing unit and a methanation unit. The synthesized gas flows through the shift reaction unit, the low-temperature methanol washing unit and the methanation unit in turn to form the synthesized natural gas. The carbon dioxides generated by the low-temperature methanol washing unit is sent to the gasification boiler fluidizing air inlets and the side product-steam by the methanation unit is sent to the gasification boiler fluidizing air inlets, or used as a supplemental steam required by the said shift reaction unit or expelled outside for other purpose.

Another technical solution of the present invention provides a poly-generation method for the solid fuel grade gasification-combustion dual bed poly-generation system, characterized by the following steps:

step 1): dividing fuel into two parts, sending one part into the combustion boiler fuel feeding opening and the other into the gasification boiler fuel feeding opening, discharging slag produced by combustion in the circulating fluidized-bed combustion boiler from the combustion boiler slag outlet and flue gas generated is expelled from the top, where a part of the particles entrained by the gas are separated by the combustion boiler cyclone separation unit. The separated particles are fed into the circulating fluidized-bed combustion boiler through the combustion boiler material return unit for further combustion. The steam produced by the circulating fluidized-bed combustion boiler is used for power generation, central heating and other purposes. The circulating fluidized-bed combustion boiler adapts air as the fluidizing air and the oxidant;

step 2): discharging semi-coke produced by the circulating fluidized-bed gasification boiler in the gasification process from the semi-coke outlet back to the circulating fluidized-bed combustion boiler for further combustion, discharging the synthesized gas from the top, collecting a part of particles entrained in the synthesized gas by the gasification boiler cyclone separation unit, sending the particles back into the circulating fluidized-bed gasification boiler through the gasification boiler material return unit for further utilization or back to the circulating fluidized-bed combustion boiler for combustion;

step 3): primarily washing and dust removal. the synthesized gas, using water as a cooling media to chill the synthesized gas in a heat exchange mode and sending the cooled gas to the methanation unit by the synthesized gas purification unit, performing oil-water separation in at least one part of the sewage generated during cooling, sending impurities emitted from the separation to the combustion boiler fuel feeding opening or the gasification boil fuel feeding opening or for further deeper processing as a by-product;

step 4): converting the fed synthesized gas into synthesized natural gas through low-temperature methanol washing process and methanation process, sending the carbon dioxides generated in the low-temperature methanol washing process to the gasification boiler fluidizing air inlets and the side product-steam by the methanation process to the gasification boiler fluidizing air inlets, or using it as a supplemental steam by the methanation unit or to be expelled outside for other use.

Preferably, in step 2), the operating pressure of the circulating fluidized-bed gasification boiler is 0~8.0 MPa, and the exit temperature of the synthesized gas reaches in the range of 650° C.~1,050° C.

The facility and system of present invention are reliable and stable in operation, is easy to be amplified to a larger size, and is environmentally-friendly and energy-saving. Compared with the prior art, the present invention also has the following beneficial effects:

First, the dual fluidized-bed set is employed to realize an associated integration of combustion and gasification and grade utilization of the solid fuels such as coal and generate a plurality of environmentally-friendly products such as electricity, heat, gas and oil, so the present invention belongs to a clean coal combustion technology for diversified application.

Second, it is very difficult to realize full combustion feature of the fuel in the reducing gas atmosphere in the gasification boiler and improve the gasification efficiency, but if the carbon residue which is not completely gasified is returned to the fluidized-bed combustion boiler for combustion, the fuel in whole system can be utilized completely, and the carbon conversion rate is far better to that of other gasification technology in this technical field.

Third, the gasification is combined with the boilers of the whole system and chemical synthesis and through features of generating steam by the boilers of the whole system, generating steam in the methanation process and generating $CO_2$ in the low-temperature methanol washing process, steam and $CO_2$ mixed with oxygen are returned as the gasifying agent of the gasification boiler, thus greatly improving the utilization rate of the side product.

Fourth, compared with the thermal decomposition process, the fluidized-bed gasification process has improved efficiency and greatly reduces the tar yield. The tar included by a small amount of the synthesized gas can be returned as a fuel to the fluidized-bed for combustion after primary separation or sold as a tar raw material, alleviating the heavy burden on the synthesized gas processing system caused by a large amount of tar generated during thermal decomposition. The system black water performs internal circulation, thus obtaining high utilization rate of the water resources.

The present invention is applicable to the western area with plenty of coal and short of water to develop the coal-based heat-electricity-gas poly-generation, and has great prospects for large-scale amplification, popularization and application.

DESCRIPTION OF THE PREFERRED EMBODIMENT

To better understand the present invention is described in detail in combination with the attached drawings and preferred embodiments.

Embodiment 1

Figure 1:
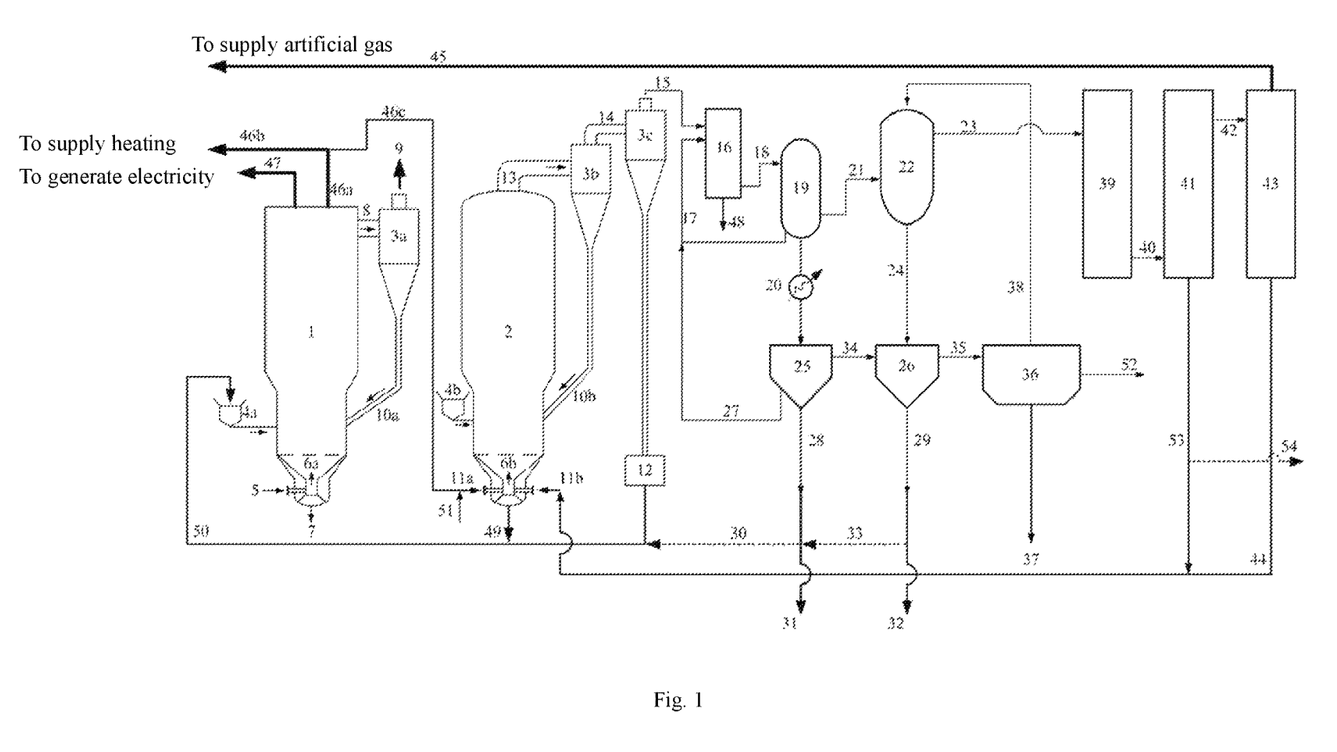
FIG. 1 is a schematic view of the solid fuel grade gasification-combustion dual bed poly-generation system without a gasifying agent inlet located one side of a gasification boiler.

As shown in FIG. 1, this embodiment discloses a solid fuel grade gasification-combustion dual bed poly-generation system, comprising a circulating fluidized-bed combustion boiler 1, a circulating fluidized-bed gasification boiler 2, a synthesized gas purification unit and a methanation unit.

A fuel (in this embodiment, the fuel is one or mixture of solid fuels such as coal, gangue, petroleum coke and biomass) is divided in two parts and fed separately into the circulating fluidized-bed combustion boiler 1 and the circulating fluidized-bed gasification boiler 2 via a combustion boiler fuel feeding opening 4a and a gasification boiler fuel feeding opening 4b. An oxidant required to complete combustion in the circulating fluidized-bed combustion boiler 1 enters a combustion boiler air distribution unit 6a via a combustion boiler fluidizing air inlet 5 and then enters the circulating fluidized-bed combustion boiler. Ash produced in the combustion process of the fuel is discharged from a combustion boiler slag outlet 7. Flue gas generated during combustion flows into a cyclone separator 3a via a gas channel 8 and then is discharged from a top 9 thereof. The separated ash particles are sent back to the circulating fluidized-bed combustion boiler 1 through a combustion boil material feedback opening 10a. The heat generated in the combustion process is used to generate combustion boiler steam 46a. The combustion boiler steam 46a can be used for heating 46b, power generation 47 and delivered to the circulating fluidized-bed gasification boiler 2 via a pipe 46c.

A gasifying agent required to perform gasification by the circulating fluidized-bed gasification boiler 2 comes from the combustion boiler steam 46a delivered via the pipe 46c and the steam 44 of the methanation unit. The oxygen comes from an outside area 51 and carbon dioxide 53 comes from the methanation unit. The gasifying agent enters the circulating fluidized-bed gasification boiler 2 via gasification boiler fluidizing inlets 11a, 11b and a gasification boiler air distribution unit 6b. Semi-coke generated during gasification is discharged from a semi-coke outlet 49. Synthesized gas passes through a synthesized gas outlet 13, then is separated by a primary cyclone separator 3b and a secondary cyclone separator 3c and then enters a synthesized gas cooling and purifying unit. The primary cyclone separator 3b and the secondary cyclone separator 3c are connected with a synthesized gas guide pipe 14 there-between. The secondary cyclone separator 3c and the synthesized gas cooling and purifying unit are connected with a synthesized gas pipe 15 there-between. The ash particles separated by the primary cyclone separator 3b are sent back into the circulating fluidized-bed gasification boiler 2 via a gasification boiler material return unit 10b, and those separated by the secondary cyclone separator 3c are collected by a slag hopper 12 and then sent to the combustion boiler fuel feeding opening 4a or the gasification boiler fuel feeding opening 4b.

The synthesized gas purification unit comprises a cooling scrubber 16, a heat recovery boiler 19, a cooling unit 22, a first oil-water separator 25, a second oil-water separator 26 and a sewage settlement tank 36. In this embodiment, the cooling scrubber 16, the heat recovery boiler 19 and the cooling unit 22 are connected through synthesized gas pipes 18, 21 in turn. The cooling unit 22 is connected with the methanation unit through a synthesized gas pipe 23.

The synthesized gas first enters the cooling scrubber 16, and is primarily washed, de-dusted and cooled then, and then enters the heat recovery boiler 19. Waste water 48 generated by the cooling scrubber 16 is discharged. The heat recovery boiler 19 is supplied with de-salted water simultaneously. The de-salted water absorbs a part of the heat of the synthesized gas and then as a scrubber cooling water is delivered to the cooling scrubber 16 via a circulating water pipe 17. A part of the heat of the synthesized gas is recovered by the de-salted water, and then the synthesized gas enters the cooling unit 22. The cooling unit 22 has a function of 1~3 stages of classification cooling. The sewage generated by the heat recovery boiler 19 and the cooling unit 22 in the heat exchange process is delivered to the first oil-water separator and the second oil-water separator 26 through respective condensing pipes 24. The condensing pipe between the heat recovery boiler 19 and the first oil-water separator 25 is also provided with a heat exchanger 20. The first oil-water separator and the second oil-water separator 26 as well as the sewage settlement tank 36 are connected in turn through sewage pipes 34, 35. The oil-water separator performs oil-water separation on a part of the sewage, and then this part of sewage is delivered to the cooling scrubber 16 through the circulating water pipe 27. Impurities such as coal tar at el. emitted from the first oil-water separator 25 and the second oil-water separator 26 are partial combustible impurities which combustible constitution reaches 5% wt to 40% wt. Those combustible impurities are sent back into the circulating fluidized-bed combustion boiler 1 or the circulating fluidized-bed gasification boiler 2 via a system fuel mixing circuit 50 to be reused or as by-products are deposed for further deeper processing 31, 32. Since the sewage collected by the sewage settlement tank 36 has been preliminary treated, the generated supernatant 38 is returned back to the cooling unit 22 through the circulating circuit 38, some of which is delivered to the outside area for sewage treatment 52 and the residual deposit 37 delivered outside the area for treatment. The exit temperature of the synthesized water after passing through the cooling scrubber 16 is 150° C.-250° C.; the exit temperature of the synthesized gas after passing through the heat recovery boiler 19 is 120° C.-180° C.; and the exit temperature after passing through the cooling unit 22 is 25° C.-45° C.

After being cooled and de-dusted by the synthesized gas purification unit, the synthesized gas enters the methanation unit. In this embodiment, the methanation unit comprises a shift reaction unit 39, a low-temperature methanol washing unit 41 and a methanation unit 43 connected in turn. The shift reaction unit 39, the low-temperature methanol washing unit 41 and the methanation unit 43 are respectively connected through the synthesized gas pipes 40, 42 in turn. The synthesized gas undergoing the low-temperature methanol washing process and the purification process has been finally converted into the qualified artificial natural gas 45. The carbon dioxide 53 generated by the low-temperature methanol washing unit 41 in the low-temperature methanol washing process can be delivered to the circulating fluidized-bed gasification boiler 2 to serve as the gasifying agent or as a by-product for further deeper process 54. The steam, a by-product of the methanation unit 43 in the methanation process can be delivered to the circulating fluidized-bed gasification boiler 2 to serve as the gasifying agent or used for other purposes.

Embodiment 2

Figure 2:
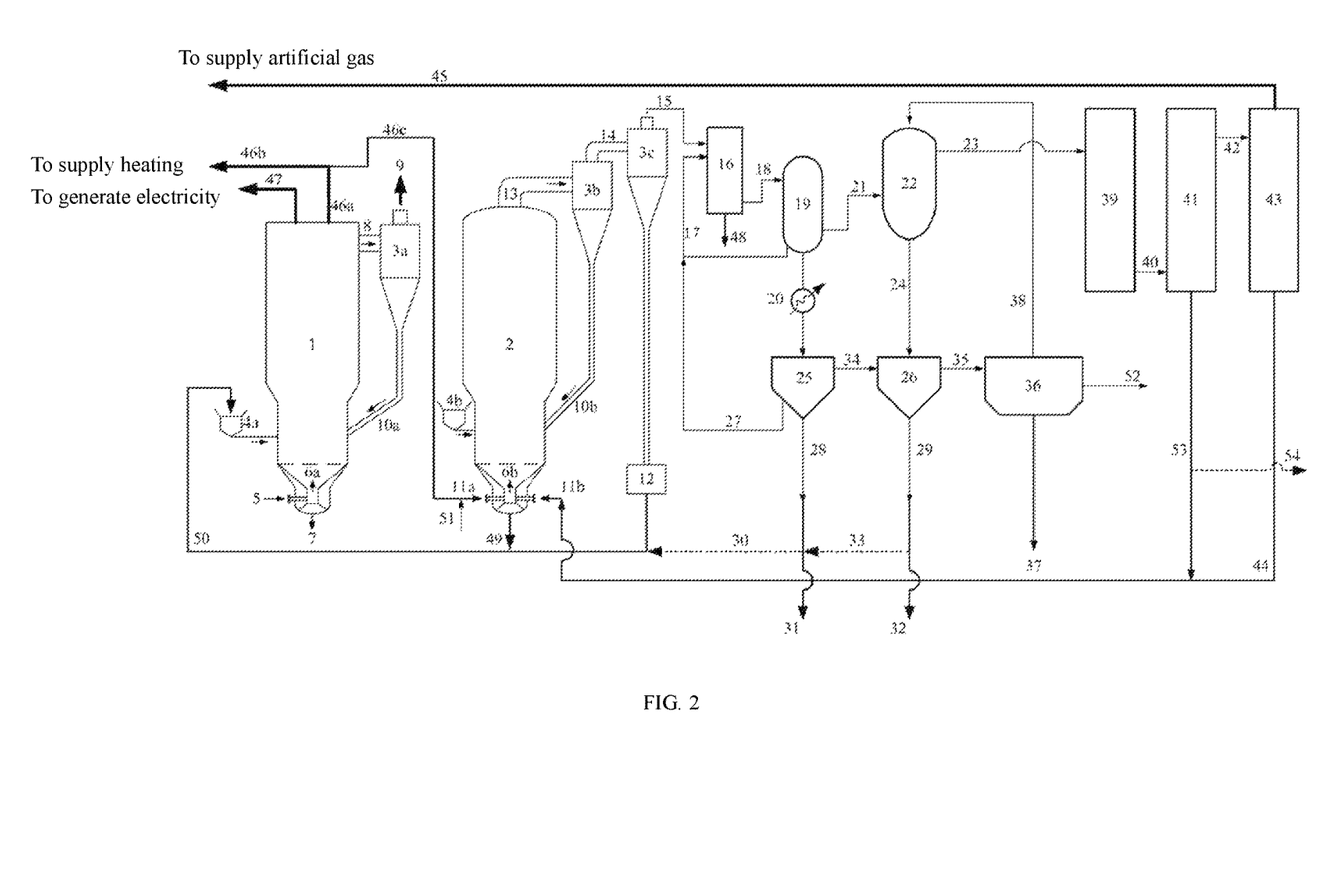
FIG. 2 is a schematic view of the solid fuel grading gasification-combustion dual bed poly-generation system with a gasifying agent inlet located one side of a gasification boiler.

As shown in FIG. 2, this embodiment discloses a solid fuel grade gasification-combustion dual bed poly-generation system, different from embodiment 1 in that, in this embodiment, there are gasifying agent feeding openings 11c and 11d upon the demands of the gasification load and the coal type located near the circulating fluidized-bed gasification boiler 2 The oxygen and steam are sent to the said gasifying agent inlets 11c, 11d to strengthen the gasification reaction, expedite the tar decomposition in the gasification process and improve the gas generation rate of the system.

Other structures are identical with those in the embodiments 1.

Embodiment 3

Figure 3:
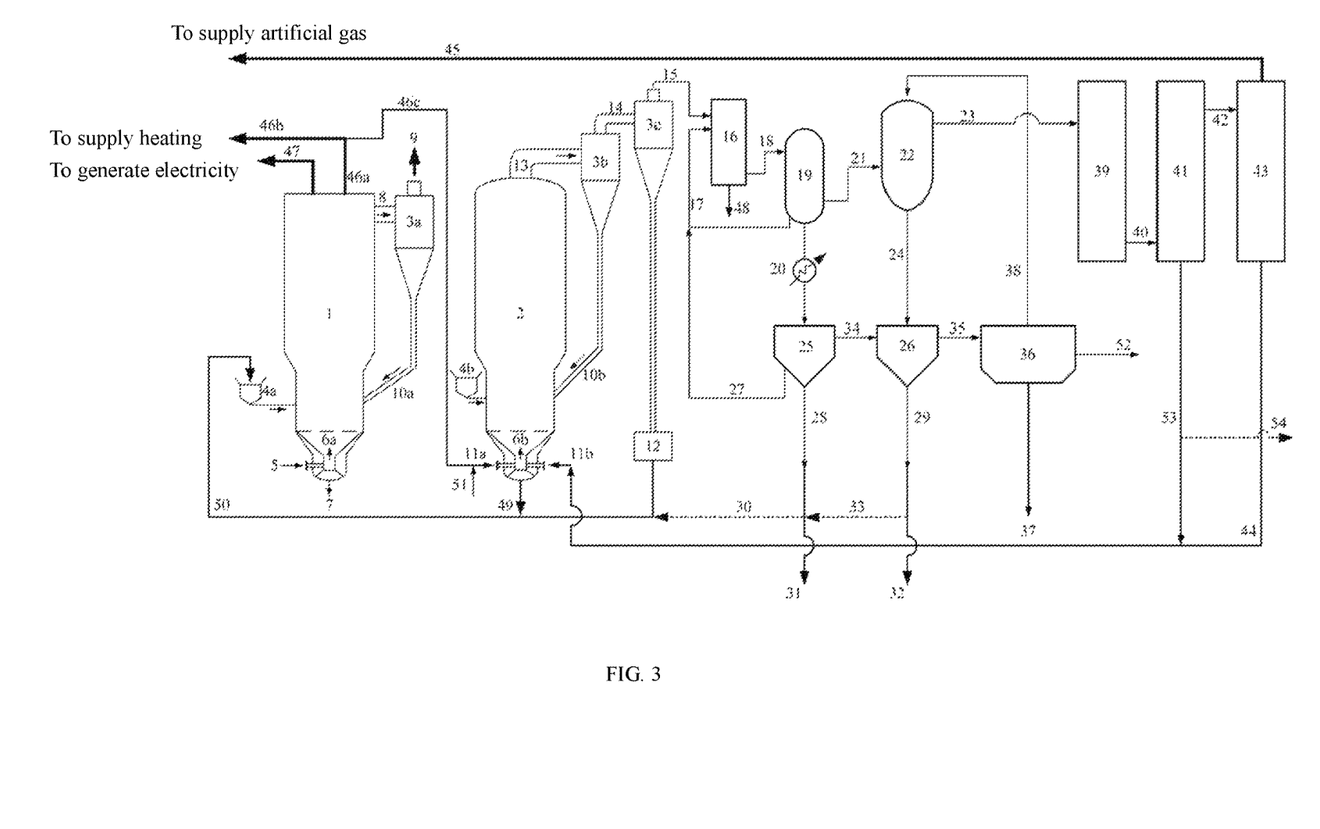
FIG. 3 is a schematic view of the heat recovery type solid fuel grading gasification-combustion dual bed poly-generation system.

As shown in FIG. 3, this embodiment is different from embodiment 1 in that:

First, the heat recovery boiler 19, the cooling scrubber 16 and the cooling unit 22 are connected in turn. The heat recovery boiler 19 is supplied with the de-salted water 55 and supplied with the synthesized gas from the secondary cyclone separator 3c simultaneously. The de-salted water 55 exchanges heat with the synthesized gas in the heat recovery boiler 19 to generate steam; the steam as a gasifying agent is sent into the gasification boiler fluidizing air inlets 11a, 11b. After the heat exchange, the synthesized gas is delivered into the cooling scrubber 16, the cooling scrubber 16 primarily washes, de-dusts and chills the fed synthesized gas and then the cooled synthesized gas enters the cooling unit 22. The sewage generated by the cooling scrubber 16 in the heat exchange process is sent to the first oil-water separator 25 through the condensing pipe 24. A part of the sewage undergoing the oil-water separation in the first oil-water separator 25 and then is led as the cooling water to the cooling scrubber 16 via the circulating water pipe 57.

Second, in the methanation unit, the shift reaction unit 39 needs steam and the steam 44 as a side product by the methanation unit in the methanation process is delivered to the shift reaction unit 39 via the pipe 58.

Other structures are identical with those in the embodiment 1.

The present invention provides a poly-generation method for the solid fuel grade gasification-combustion dual bed poly-generation system according to any one of embodiments, characterized by comprising the following steps of:

step 1): dividing fuel into two parts, sending one part into the combustion boiler fuel feeding opening 4a and the other into the gasification boiler fuel feeding opening 4b. The discharging slag produced by combustion in the circulating fluidized-bed combustion boiler 1 from the combustion boiler slag outlet 7 and flue gas generated is expelled from the top, where a part of particles entrained by the gas are separated by the combustion boiler cyclone separation unit. The separated particles are into the circulating fluidized-bed combustion boiler 1 through the combustion boiler material return unit 10a for further combustion. The steam produced by the circulating fluidized-bed combustion boiler 1 is used for power generation, central heating and other purposes. The circulating fluidized-bed combustion boiler 1 adapts air as the fluidizing air and oxidant;

step 2): discharging semi-coke produced by the circulating fluidized-bed gasification boiler 2 in the gasification process from the semi-coke outlet 49 back to the circulating fluidized-bed combustion boiler 1 for further combustion, discharging the synthesized gas from the top, collecting a part of particles entrained in the synthesized gas by the gasification boiler cyclone separation unit, sending the particles back into the circulating fluidized-bed gasification boiler 2 through the gasification boiler material return unit 10b for further utilization or back to the circulating fluidized-bed combustion boiler 1 for combustion. The circulating fluidized-bed gasification boiler may be set as a normal pressure system or a compression system, the operating pressure thereof is 0~8.0 MPa, and the exit temperature of the synthesized gas reaches 650° C.~1,050° C.;

step 3): primarily washing and de-dusting the synthesized gas, using water as a cooling media to chill the synthesized gas in a heat exchange mode and sending the cooled gas to the methanation unit by the synthesized gas purification unit, performing oil-water separation on at least one part of the sewage generated during cooling, sending impurities emitted from the separation to the combustion boiler fuel feeding opening 4a or the gasification boil fuel feeding opening 4b or for further deeper processing the at least a part of sewage as a side product;

step 4): converting the fed synthesized gas into synthesized natural gas through low-temperature methanol washing process and methanation process, where the $CH_4$ content in the natural gas reaches 96%; sending the carbon dioxide generated in the low-temperature methanol washing process to the gasification boiler fluidizing air inlets 11a, 11b, sending the side product-steam by the methanation process to the gasification boiler fluidizing air inlets 11a, 11b, or using it as a supplemental steam required by the methanation unit or to be expelled outside for other use.

What is claimed is:

1. A solid fuel grade gasification-combustion dual bed poly-generation system, comprising: a circulating fluidized-bed combustion boiler (1), a circulating fluidized-bed gasification boiler (2), a synthesized gas purification unit and a methanation unit;

wherein a bottom of the circulating fluidized-bed combustion boiler (1) is provided with a combustion boiler slag outlet (7) and a combustion boiler fluidizing air inlet (5); the fluidizing air enters the combustion boiler fluidizing air inlet (5) and then flows to the circulating fluidized-bed combustion boiler (1) via a combustion boiler air distribution unit (6a), one part of the fuel enters the circulating fluidized-bed combustion boiler (1) via a combustion boiler fuel feeding opening (4a), flue gas generated during combustion enters at least a primary combustion boiler cyclone separation unit via a gas channel (8), the gas after separation is directly exhausted, while separated ash particles are returned back into the circulating fluidized-bed combustion boiler via a combustion boiler material return unit (10a), the heat generated during combustion is used to produce combustion boiler steam (46a) and the steam (46a) from combustion boiler is used for external supply and is supplied to the circulating fluidized-bed gasification boiler (2);

the bottom of the circulating fluidized-bed gasification boiler (2) is provided with a semi-coke outlet (49) and gasification boiler fluidizing air inlets (11a, 11b); a gasifying agent for gasification is sent into the gasification boiler fluidizing air inlets (11a, 11b) and then flows into the circulating fluidized-bed gasification boiler (2) via a gasification boiler air distribution unit (6b), steam (44) in the gasifying agent comes from a combustion boiler steam (46a) and/or methanation unit, carbon dioxide is the carbon dioxide generated by the methanation unit, the other part of the fuel is fed into the circulating fluidized-bed gasification boiler (2) via a gasification boiler fuel feeding opening (4b), the semi-coke generated by gasification is discharged via a semi-coke outlet (49) and then sent into the combustion boiler fuel feeding opening (4a), the synthesized gas enters at least a primary gasification cyclone separation unit via a synthesized gas outlet on top of the circulating fluidized-bed gasification boiler, after separation the synthesized gas is sent into a synthesized gas purification unit, while the separated ash particles are sent back into the circulating fluidized-bed gasification boiler (2) and/or the combustion boiler fuel feeding opening (4a) via a gasification boiler material return unit (10b), the synthesized gas purification unit primarily washes and de-dusts the synthesized gas, uses water as a cooling media to chill the synthesized gas in a heat exchange mode, sends the cooled gas to the methanation unit, a sewage including oil and water is generated during the cooling process, performs oil-water separation on at least one part of the sewage including oil and water generated during cooling, and sends impurities expelled from the separation to the combustion boiler fuel feeding opening (4a) or the gasification boil fuel feeding opening (4b) or sends by-products obtained for further processing;

the methanation unit converts the fed synthesized gas into synthesized natural gas through low-temperature methanol washing process and methanation process, sends carbon dioxides generated in the low-temperature methanol washing process to the gasification boiler fluidizing air inlets (11a, 11b) and the steam (44) as a side produced by the methanation process to the gasification boiler fluidizing air inlets (11a, 11b), or as a supplemental steam required by the methanation unit or discharges the stream for other purposes;

wherein the synthesized gas purification unit comprises a cooling scrubber (16), a heat recovery boiler (19), a cooling unit (22), a first oil-water separator (25), a second oil-water separator (26) and a sewage settlement tank (36); the synthesized gas coming from the gasification boiler cyclone separator unit is sent into the cooling scrubber (16) or the heat recovery boiler (19), when the synthesized gas is sent into the cooling scrubber (16), the cooling scrubber (16), the heat recovery boiler (19) and the cooling unit (22) are connected in turn, wherein the cooling scrubber (16) primarily washes, de-dusts and chills the synthesized gas and then the cooled synthesized gas is sent into the heat recovery boiler (19), the heat recovery boiler (19) is also supplied with de-salted water (55) simultaneously, the de-salted water (55) exchanges heat with a synthesized water in the heat recovery boiler (19) and then as a cooling water is led to the cooling scrubber (16), the synthesized gas enters the cooling unit (22) after the heat exchange, the cooling unit (22) receives supernatant (38) as a cooling media from the sewage settlement tank (36) simultaneously, the synthesized gas flows out of the cooling unit (22) and then is sent into the methanation unit, the sewage expelled from the heat recovery boiler (19) and the cooling unit (22) in the heat exchange process is sent to the first oil-water separator (25) and the second oil-water separator (26) through respective pipes, the first oil-water separator (25) and the second oil-water separator (26) as well as the sewage settlement tank (36) are connected in turn, a part of the sewage undergoes separation in the first oil-water separator (25), the obtained product as a washing water is led to the cooling scrubber (16), and the impurities expelled by the first oil-water separator (25) and the second oil-water separator (26) are sent to the combustion boiler fuel feeding opening (4a) or sent to the gasification boiler fuel feeding opening (4b) or as side products are used for further process, a part of the sewage passes through the first oil-water separator (25) and the second oil-water separator (26) and then is collected in the sewage settlement tank (36), the supernatant (38) produced by the sewage settlement tank (36) is sent to the cooling unit (22), residual deposits (37) are sent out of the system for further process, and the rest of which is sent out of the system for sewage treatment (52), when the synthesized gas is sent into the heat recovery boiler (19), the heat boiler (19), the cooling scrubber (16) and the cooling unit (22) are connected in turn; the heat recovery boiler (19) is supplied with de-salted water (55) and supplied with the synthesized gas from the gasification boiler cyclone separation unit simultaneously, the de-salted water (55) exchanges heat with the synthesized water in the heat recovery boiler (19) to form steam, which as a gasifying agent is sent into the gasification boiler fluidizing air inlets (11a, 11b), after heat exchange, the gasifying agent is sent into the cooling scrubber (16), the cooling scrubber (16) primarily washes, de-dusts and chills the fed synthesized gas and then the cooled synthesized gas is sent into the cooling unit (22), the cooling unit (22) is also supplied with a supernatant (38) as a cooling media from the sewage settlement tank (36) simultaneously and the synthesized gas flows out of the cooling unit (22) and then is sent into the methanation unit, the sewage produced by the cooling scrubber (16) and the cooling unit (22) in the heat exchange process is sent to the first oil-water separator (25) and the second oil-water separator (26) through respective pipes the first oil-water separator (25) and the second oil-water separator (26) as well as the sewage settlement tank (36) are connected in turn, a part of the sewage is separated by the first oil-water separator (25) and the product as the washing water is led to the cooling scrubber (16), the impurities expelled by the first oil-water separator (25) and the second oil-water separator (26) are sent to the combustion boiler fuel feeding opening (4a) or sent to the gasification boiler fuel feeding opening (4b) or as by-products are used for further process, a part of the sewage passes through the first oil-water separator (25) and the second oil-water separator (26) and then is collected in the sewage settlement tank (36), the supernatant (38) produced by the sewage settlement tank (36) is sent to the cooling unit (22), and deposits (37) accumulated are sent out of the solid fuel grade gasification-combustion dual bed poly-generation system for processing and the rest of which is sent out of the solid fuel grade gasification-combustion dual bed poly-generation system for sewage treatment (52).

2. The solid fuel grade gasification-combustion dual bed poly-generation system according to claim 1, characterized in that, the gasification boiler cyclone separation unit is a two-class cyclone separation structure consisting of a primary cyclone separator (3b) and a secondary cyclone separator (3c), wherein the ash particles expelled by the primary cyclone separator (3b) are sent back into the circulating fluidized-bed gasification boiler (2) through the gasification boiler material return unit (10b), and those particles expelled by the secondary cyclone separator (3c) are sent back into the combustion boiler fuel feeding opening (4a).

3. The solid fuel grade gasification-combustion dual bed poly-generation system according to claim 1, characterized in that, the circulating fluidized-bed gasification boiler (2) is also provided with side gasifying agent inlets (11c, 11d), the side gasifying agent inlets (11c, 11d) are located above the gasification boiler fluidizing air inlets (11a, 11b), wherein oxygen and steam are sent into the side gasifying agent inlets (11c, 11d).

4. The solid fuel grade gasification-combustion dual bed poly-generation system according to claim 1, characterized in that, a steam generated in the process that the synthesized gasification unit chills the synthesized gas is led to the gasification boiler fluidizing air inlets (11a, 11b).

5. The solid fuel grade gasification-combustion dual bed poly-generation system according to claim 1, characterized in that, when the synthesized gas is sent into the cooling scrubber (16), the heat recovery boiler (19) is connected to the first oil-water separator (25) through the heat exchanger (20).

6. The solid fuel grade gasification-combustion dual bed poly-generation system according to claim 1, characterized in that, when the synthesized gas is sent into the cooling scrubber (16), the exit temperature of the synthesized gas after flowing through the cooling scrubber (16) is 150° C.-250° C., the exit temperature of the synthesized gas after passing through the heat recovery boiler (19) is 120° C.-180° C.; the exit temperature after passing through the cooling unit (22) is 25° C.-45° C.

7. The solid fuel grade gasification-combustion dual bed poly-generation system according to claim 1, characterized in that, the methanation unit comprises of a shift reaction unit (39), a low-temperature methanol washing unit (41) and a methanation unit (43), the synthesized gas flows through the shift reaction unit (39), the low-temperature methanol washing unit (41) and the methanation unit (43) in turn to form the synthesized natural gas, the carbon dioxide generated by the low-temperature methanol washing unit (41) is sent to the gasification boiler fluidizing air inlets (11*a*, 11*b*) and the steam (44) side produced by the methanation unit (43) is sent to the gasification boiler fluidizing air inlets (11*a*, 11*b*), or as a supplemental steam required by the methanation (39) or is discharged for other purposes.

* * * * *